UNITED STATES PATENT OFFICE.

GEORGE DAVIS, OF OTTAWA, MINNESOTA.

PROCESS OF CURING CEREALS.

SPECIFICATION forming part of Letters Patent No. 284,284, dated September 4, 1883.

Application filed April 9, 1883. (No specimens.)

*To all whom it may concern:*

Be it known that I, GEORGE DAVIS, of Ottawa, in the county of Le Sueur and State of Minnesota, have invented an Improved Process for Curing Cereals; and I do hereby declare the following to be a clear, full, and exact description of the same.

My invention relates to the curing of cereals in bulk, in order to eliminate all injurious liquids therefrom, and to prevent any subsequent absorption of moisture, which causes them to sour and spoil; and it consists in the novel process hereinafter explained and claimed.

In all cereals and herbs there is a watery substance which is seriously detrimental to the keeping qualities of these articles, it matters not how well they are dried nor how well they are stored. They naturally absorb moisture if stored in bulk, and this will cause the bulk to sweat, and if not stirred and dried off in proper time the whole mass will become sour and spoil.

The object of my present invention is to prevent the absorption of moisture and the sweating of the cereals after being stored by curing them in advance of storage.

To enable others skilled in the art to use my invention, I will proceed to describe the exact manner in which I have carried it out.

By my process I force the cereals, after removing all impurities, into a proper condition to eliminate those substances which cause them to heat and sweat by carrying them through the heating and sweating process in bulk and drying them off rapidly by stirring and removing from bin to bin, or by any equivalent means, the object sought being a rapid drying of the grain after sweating it. I find by actual experiment that wheat, corn, and other grains, after being once thoroughly sweated and dried, will not absorb moisture, and if moistened will not heat or become damaged therefrom. Wheat thus prepared I find grinds perfectly dry and bolts without the slightest difficulty, the whole process of making flour is improved, and it is ascertained that the bread is better in every particular.

To carry out my process successfully I find by actual experiment that it is absolutely necessary to stir the entire mass well immediately after it has been thoroughly sweated, and dry it off perfectly, or it will spoil to a greater or less degree.

My mode of operation is, while running the grain into a bin, to steam it, so as to warm and evenly moisten it sufficiently to cause it to sweat thoroughly. Just as soon as it is done sweating, it is necessary to stir and change it, when it will be found to dry very rapidly. I have a short conveyer at the head of the elevator that carries the wheat from the cleaning-work to the stock-bins. To this I attach a steam-pipe with a cock, so that I can let in just as much steam as may be desired. By this means the grain is evenly steamed as it is dropped into the bin, and is almost immediately in a sweat. In about twenty-four hours thereafter, more or less, I run the grain through the wheat-separator into another bin, and the curing operation is complete.

I do not confine my invention to any particular devices for steaming and drying, as this may be accomplished in a great variety of ways without departing from the spirit of my invention. Cereals thus cured may be safely kept any length of time, or be transported into any climate without danger of souring, and in grinding cereals thus prepared I notice that there is no perceptible heat beyond that arising from friction, and no moisture accumulates anywhere to interfere with perfect separation.

I am aware that it is not new to steam cereals as they pass from the bin to the hopper of the mill; but such is not my invention.

Having thus described my invention, what I claim as new, and desire to secure by Letters Patent, is—

The process of curing cereals herein described, the same consisting in first steaming the cereals and sweating them in bulk about twenty-four hours, and then rapidly drying them, substantially as and for the purpose herein described.

GEORGE DAVIS.

Witnesses:
L. QUACKENBUSH,
FRANCIS CADWELL.